Sept. 18, 1951 H. JEFFERSON 2,568,397

TELEPHONE TERMINAL EQUIPMENT

Filed Feb. 19, 1948 2 Sheets-Sheet 1

INVENTOR
Harold Jefferson
BY Harry Tunick
ATTORNEY

Sept. 18, 1951 H. JEFFERSON 2,568,397

TELEPHONE TERMINAL EQUIPMENT

Filed Feb. 19, 1948 2 Sheets-Sheet 2

INVENTOR
Harold Jefferson
BY Barry Tunick
ATTORNEY

Patented Sept. 18, 1951

2,568,397

UNITED STATES PATENT OFFICE 2,568,397

TELEPHONE TERMINAL EQUIPMENT

Harold Jefferson, Stockholm, Sweden, assignor to Radio Corporation of America, a corporation of Delaware Application February 19, 1948, Serial No. 9,541. In Great Britain February 20, 1947

7 Claims. (Cl. 179—1)

This invention relates to telephone terminal equipment and more particularly to terminal equipment of the kind comprising a transmitting channel and a receiving channel associated with a subscriber's line. Telephone terminal equipment of this kind commonly comprises a trunk or other subscriber's telephone line associated through a hybrid coil set with a radio transmitter and a radio receiver so that a subscriber on the line can speak or hear over a radio link.

As is well known a common arrangement for telephone terminal equipment of the kind referred to comprises means automatically actuated in dependence upon signals for blocking the transmitting channel when the receiving channel is operative and for blocking the receiving channel when the transmitting channel is operative.

According to this invention a telephone terminal equipment of the kind referred to is provided in the receiving channel with a network having three selectable conditions of attenuation or gain, in one of which the receiving channel is of standard sensitivity, in the second of which the receiving channel is of reduced sensitivity and in the third of which the receiving channel is of greatly reduced or zero sensitivity and one or the other of these three selectable conditions is automatically established in such manner that when the transmitter is operating the third condition is established, when the transmitter is not operating but no speech is being received the second condition is established, while when the transmitter is not operating and speech is being received the first condition is established.

The invention provides its main advantages owing to the now discovered fact that for physiological or psychological reasons a considerable practical improvement in the effectiveness of a telephone communication system is obtained, if, during reception, noise is reduced in the absence of speech. The explanations of this improvement are, to some extent, conjectural but it may well be that they are at least in part to be found in the fact that if noise is reduced in the intervals of absence of speech, the ear is rested in such intervals and remains more sensitive to speech occurring between such intervals. Whether or not this explanation is sufficient, experiment has shown that the improvement does, in fact, occur and indeed experiment indicates that, in operating a system in accordance with this invention, it should be possible to obtain effective operation with a signal-noise ratio substantially below that which would otherwise be required for the same results.

Preferably, in carrying out the invention, the network having three selectable conditions of attenuation or gain is constructed in any convenient manner known per se to establish a selected one of those conditions in dependence upon which of three predetermined control voltages is applied thereto and these three voltages are obtained by means including a scale-of-three counter in turn controlled by an amplifier detector fed from the input side of the receiving channel.

The invention is illustrated in the accompanying drawings, in which.

Figure 1:
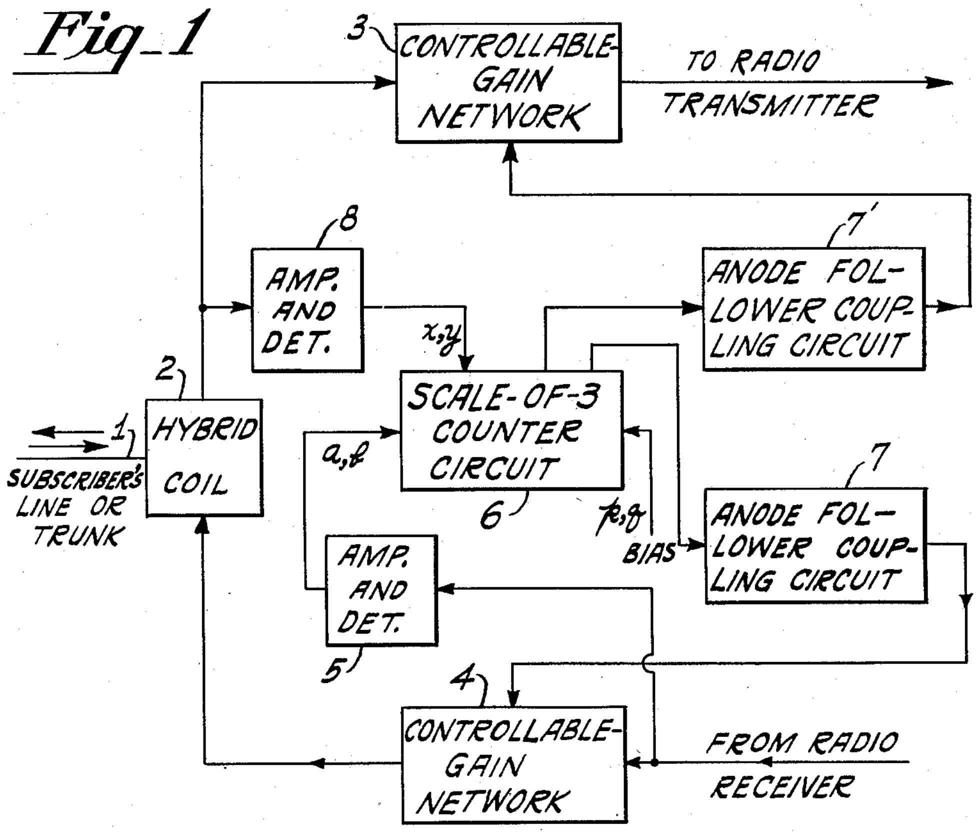
Fig. 1 is a block diagram of a terminal station according to this invention.

Referring to Fig. 1 of the drawings, a trunk or other subscriber's line 1 is associated with a radio transmitter (not shown) and with a radio receiver (not shown) through a hybrid coil set 2, the channel to the transmitter including a network 3 of controllable attenuation or gain and the channel from the receiver also including such a network 4. The network 4 has three conditions of attenuation or gain as already described, while the network 3 has two conditions, namely one of standard sensitivity and the other of greatly reduced or zero sensitivity. A circuit is branched off from the input side of the receiving channel to an amplifier-detector 5 whose output is fed, by means of the connection labeled *a*, *b* as one of the controlling or input voltages to a scale-of-three counter 6 which can provide, by means of appropriate output connections therein, one of three voltages in dependence upon the output from the amplifier detector 5. The counter 6 controls, via an anode follower coupling circuit 7, the network 4 in the receiving channel having three conditions of attenuation or gain, one or other of these conditions being established in dependence upon which of the three voltages is provided by the counter 6. A second amplifier detector 8 is fed from a circuit branched off from the hybrid coil side of the transmitting channel and the output of such amplifier detector is also fed, by means of the connection labeled *x*, *y*, as another controlling or input voltage to counter 6 which can also provide, by means of appropriate output connections therein, one of two voltages in dependence upon the output from the amplifier detector 8. The counter 6 also controls, via an anode follower coupling circuit 7', the network 3 (in the transmitting channel) having two conditions of attenuation or gain, one or the other of these conditions being established in dependence upon which of the two voltages is provided by the counter 6.

Figure 2:
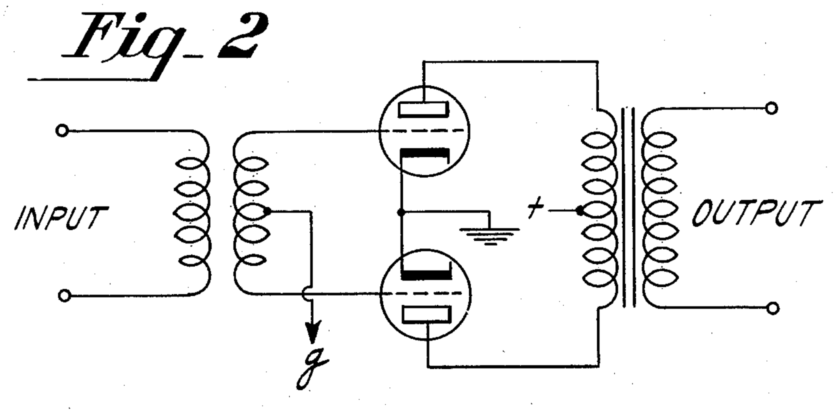
Fig. 2 is a detailed circuit diagram of a portion of Fig. 1.

The two controllable-gain networks 3 and 4 are, conveniently, push-pull amplifiers such as shown in Fig. 2, the gain (or attenuation) of these networks may be varied by variation of the bias applied at point $g$. Networks of this type are quite conventional and are well-known to those versed in the art. Although the tubes of the push-pull amplifier are shown as triodes in Fig. 2, variable-mu pentodes and tetrodes would in fact be used, the connections to the other electrodes being conventional.

Figure 3:
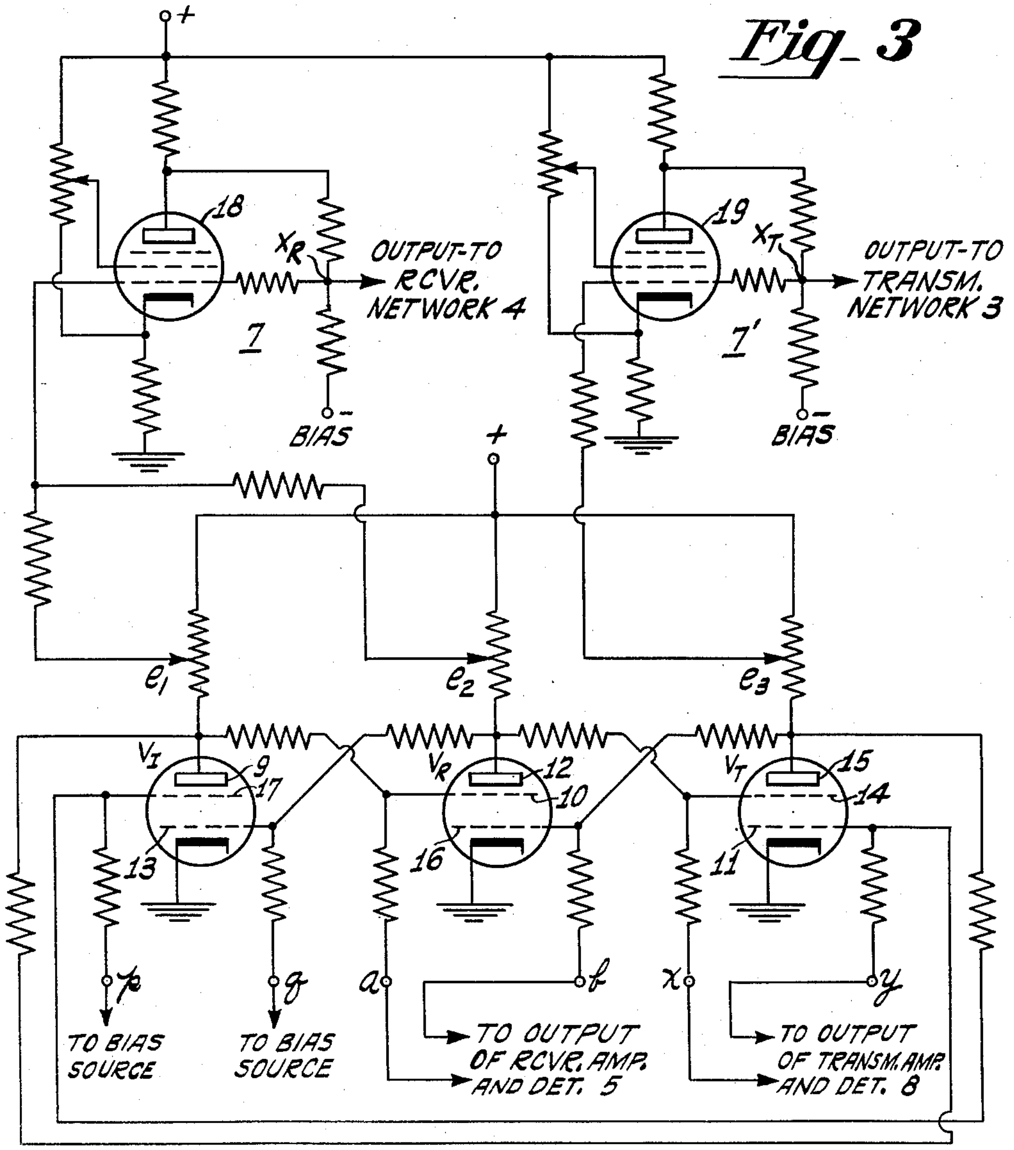
Fig. 3 is a detailed circuit diagram of another portion of Fig. 1.

Signals are tapped off the respective paths by the units 5 and 8 and rectified by the detectors therein. These detector circuits are quite conventional. Appropriate fractions of the rectified signal form the controlling input or bias voltages fed in at $a$, $b$ and $x$, $y$ to the scale-of-three circuit, shown in detail in Fig. 3.

The tubes $V_I$, $V_R$ and $V_T$, herein termed the "idle," "receiving" and "transmitter" tubes, respectively, are pentodes which have good suppressor grid control. The screen grids and screen grid connections of these tubes are not shown, as they are straightforward D. C. connections. The tubes $V_I$, $V_R$ and $V_T$ are interconnected in such a way that any pair of them acts as a resistance-coupled multivibrator or trigger circuit and snaps from the on position to the off, or vice versa, only one tube of the three being on at any one time. The anode 9 of tube $V_I$ is coupled through a resistor to the suppressor grid 10 of tube $V_R$, and through another resistor to the control grid 11 of tube $V_T$. The anode 12 of tube $V_R$ is coupled through a resistor to the control grid 13 of tube $V_I$ and through another resistor to the suppressor grid 14 of tube $V_T$. The anode 15 of tube $V_T$ is coupled through a resistor to the control grid 16 of tube $V_R$ and through another resistor to the suppressor grid 17 of tube $V_I$. The cathodes of all of the tubes are connected to ground and the negative side of a potential source, while the anodes of all the tubes are connected through individual resistors to the positive side of the potential source.

Points $p$ and $q$ (indicated as a bias connection in Fig. 1) are connected through individual resistors to suppressor grid 17 and control grid 13, respectively, such points being connected to a suitable bias potential source to bias the two grids of tube $V_I$. The bias potentials and resistors are so selected that in the absence of any signals the points $p$ and $q$ are sufficiently positive to maintain tube $V_I$ in the conducting condition. The anode 9 is therefore at a low potential, and $V_T$ is cut off by means of the connection from such anode to control grid 11, and $V_R$ is cut off by means of the connection from said anode to suppressor grid 10.

Points $a$ and $b$ are connected by individual resistors to suppressor grid 10 and control grid 16, respectively, and to the output of amplifier and detector 5, in order to supply signal from the receiving path of the system to the grids of tube $V_R$. When a signal of greater than a predetermined amplitude appears in the receiving path, the output of detector 5 drives grids 10 and 16 positive until $V_R$ conducts. This causes a fall in the potential of anode 12, which is transferred through the resistance coupling to the control grid 13 of $V_I$ to cut off $V_I$. The potential of anode 9 rises as $V_I$ is cut off, helping to bring up the voltage on suppressor grid 10, thereby further aiding the turning-on of tube $V_R$. Although at the same time the potential on control grid 11 of tube $V_T$ is brought up from its cut-off potential (due to the connection from anode 9 to such control grid) the fall or drop of potential at anode 12 (due to conduction in $V_R$) holds down the potential on suppressor grid 14 sufficiently to maintain $V_T$ non-conducting.

Thus, as so far described, the pair of tubes $V_R$ and $V_I$ acts as a resistance-coupled multivibrator, snapping from the condition in which $V_I$ is on and $V_R$ off to the condition in which $V_R$ is on and $V_I$ off; only one tube is on at any one time.

Points $x$ and $y$ are connected by individual resistors to suppressor grid 14 and control grid 11, respectively, and to the output of amplifier and detector 8, in order to supply signal from the transmitting path of the system to the grids of tube $V_T$. When a signal of predetermined strength appears in the transmitting path, the output of detector 8 drives grids 14 and 11 positive until $V_T$ conducts, provided that $V_R$ is not being held on by the output of detector 5. When $V_T$ conducts, the potential of its anode 15 drops, and this drop is transferred through the resistance coupling to the control grid 16 of $V_R$ to cut off $V_R$. The potential of anode 12 rises as $V_R$ is cut off, helping to bring up the voltage on suppressor grid 14, thereby further aiding the turning-on of tube $V_T$. Although at the same time the potential on control grid 13 of tube $V_I$ is brought up from its cut-off potential (due to the connection from anode 12 to such control grid) the fall or drop of potential at anode 15 (due to conduction in $V_T$) holds down the potential on suppressor grid 17 sufficiently to maintain $V_I$ non-conducting. Thus, the pair of tubes $V_T$ and $V_R$ also acts as a resistance-coupled multivibrator, snapping from the condition in which $V_R$ is on and $V_T$ off to the condition in which $V_T$ is on and $V_R$ off; only one tube is on at any one time. In fact, any pair of the tubes $V_I$ and $V_R$ and $V_T$ acts as a resistance-coupled multivibrator, snapping from the on condition to the off.

When $V_R$ is conducting (signal in the receiving path and transmitter not operating) I need to apply a suitable voltage (say −2 volts) to the gain connection $g$ (see Fig. 2) of the receiving network 4, to provide standard sensitivity for the receiving channel, and when $V_I$ is conducting (transmitter not operating and no speech or signal being received) I need a smaller voltage (say −6 volts) which will cause an additional loss in network 4 of about 12 db. To convert the anode potential drops to the required voltage rises, I use the anode follower circuit 7. One drive $e_1$ for anode follower 7 is taken from a tapping point on the anode resistor of tube $V_I$ and is applied through a resistor to the control grid of a pentode 18. The second drive $e_2$ for anode follower 7 is taken from a tapping point on the anode resistor of tube $V_R$ and is applied through a resistor to the control grid of tube 18. The drives $e_1$ and $e_2$ may be taken directly from the respective anodes 9 and 12 if desired.

With $V_T$ conducting ($V_I$ and $V_R$ nonconducting, transmitter on) both $e_1$ and $e_2$ are large positive, and tube 18 draws large anode current to make its output point $X_R$ negative enough to cut off, or to produce about 50 db. loss in, receiver network 4, it being recalled that $V_T$ conducts when the transmitter is on or operating. Thus, when the transmitter is on the receiving channel is blocked or heavily attenuated. The drive $e_3$ for anode follower 7′ is taken from a tapping point on the anode resistor of tube $V_T$ (it might be taken directly from anode 15) and is applied through a resistor to the control grid of a pentode 19. When $V_T$ is conducting, anode follower 7′ has a low input voltage $e_3$ so that tube 19 is off and its output point $X_T$ is positive, bringing transmitter network 3 on or up to standard sensitivity.

With $V_I$ conducting (noise reduction-idle condition) $e_1$ drops, decreasing the anode current in tube 18 and causing the potential at $X_R$ to rise; this partly opens receiver network 4, or reduces the loss in such network to about 12 db. As $V_T$ is cut off (when $V_I$ conducts), $e_3$ rises, bringing on tube 19 and making its output point $X_T$ negative; the transmitting anode follower 7' then cuts off the transmitting network 3 or causes it to go to zero sensitivity.

If $V_R$ conducts (receiving condition), $V_T$ is still non-conducting (network 3 therefore being of zero sensitivity), but $e_2$ now drops, further decreasing the anode current in tube 18 and causing the potential at $X_R$ to rise further; this opens receiver network 4 completely, to provide standard sensitivity for the receiving channel. The drive $e_1$ may be made smaller than $e_2$ either by tapping down the anode load of tube $V_I$ or by using a smaller load resistor than that used for tube $V_R$.

To summarize the above operation, when the receiving channel is of standard sensitivity suitable for the reception of speech or of reduced sensitivity (the last condition occurs in the absence of received speech and in the simultaneous absence of transmission) the transmitting channel is blocked or heavily attenuated by network 3, while when the receiving channel is blocked or heavily attenuated by network 4 the transmitting channel is of standard sensitivity.

The hybrid coil 2 is of any suitable form well known per se and is consequently not shown in detail but represented merely by a block in the Fig. 1 diagram.

Although the invention is not limited to the use of any particular values of attenuation, satisfactory results may be obtained by including in the receiving channel a three-condition network 4 which is arranged in one condition to introduce a very small standard loss or gain, in another condition to introduce an additional loss of about 12 bd. and in the last condition to introduce an additional loss of 50 db. or more.

Mutually interlocking control of the sensitivities of the transmitting and receiving channels as known per se in terminal equipment of the kind in question may be employed in conjunction with the present invention.

Having now particularly described and ascertained the nature of my said invention and in what manner the same is to be performed I declare that what I claim is:

1. In a communication terminal arrangement, a transmitting channel, a receiving channel, a voltage-responsive network of controllable gain in said receiving channel, means for producing a selected one of three predetermined control voltages in response to signal strengths in the transmitting and receiving channels, and means for applying the produced control voltage to said network to control the same to produce a corresponding predetermined gain in signals passing therethrough.

2. An arrangement as defined in claim 1 wherein said first named means produces one control voltage to give standard gain in said network in response to a predetermined signal strength in said receiving channel, a second control voltage to give reduced gain in said network in response to a signal strength of less than a predetermined value in said receiving channel, and a third control voltage to give further reduced gain in said network in response to a predetermined signal strength in said transmitting channel.

3. An arrangement as defined in claim 2 wherein the standard gain is a condition of negligible attenuation, the reduced gain is a condition of approximately 12 db. attenuation, and the further reduced gain is a condition of at least 50 db. attenuation.

4. An arrangement as defined in claim 1 wherein the first-named means includes three electron discharge devices interconnected in such a way that any pair of them acts as a trigger circuit, the said discharge devices being controlled in part by an amplifier detector fed from the input side of the receiving channel and in part by an amplifier detector fed from the input side of the transmitting channel.

5. An arrangement as defined in claim 1 wherein said second-named means includes an anode follower circuit having its input coupled to said first-named means and its output coupled to said network.

6. An arrangement as defined in claim 1 wherein a voltage-responsive network of controllable gain is inserted in the transmitting channel and wherein said first-named means produces also a selected one of two predetermined control voltages in response to signal strengths in said channels, for controlling the gain of the network in the transmitting channel.

7. An arrangement as defined in claim 6 wherein said first-named means produces a first set of control voltages to give standard gain in the receiving channel network and high attenuation in the transmitting channel network in response to a predetermined signal strength in said receiving channel, a second set of control voltages to give reduced gain in the receiving channel network and high attenuation in the transmitting channel network in response to a signal strength of less than a predetermined value in said receiving channel, and a third set of control voltages to give further reduced gain in the receiving channel network and standard gain in the transmitting channel network in response to a predetermined signal strength in said transmitting channel.

HAROLD JEFFERSON.

REFERENCES CITED

The following references are of record in the file of this patent:

UNITED STATES PATENTS

| Number | Name | Date |
|---|---|---|
| 1,654,633 | Bisbee | Jan. 3, 1928 |
| 1,763,169 | Mathes | June 10, 1930 |
| 2,018,464 | Nebel | Oct. 22, 1935 |
| 2,205,142 | Hoard | June 18, 1940 |
| 2,278,828 | Chardio | Apr. 7, 1942 |
| 2,282,405 | Herrick | May 12, 1942 |
| 2,366,011 | Donaldson | Dec. 26, 1944 |
| 2,370,388 | Baird | Feb. 27, 1945 |